United States Patent
Wang et al.

(10) Patent No.: US 11,662,983 B2
(45) Date of Patent: *May 30, 2023

(54) BYTECODE VERIFICATION USING CLASS RELATIONSHIP CACHING

(71) Applicant: INTERNATIONAL BUSINESS MACHINES CORPORATION, Armonk, NY (US)

(72) Inventors: Sharon Wang, Ottawa (CA); Daniel Heidinga, Ottawa (CA); Hang Shao, Ottawa (CA); Oluwatobi Ajila, Ottawa (CA); Graham Chapman, Nepean (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,526

(22) Filed: May 27, 2022

(65) Prior Publication Data

US 2022/0283785 A1 Sep. 8, 2022

Related U.S. Application Data

(63) Continuation of application No. 16/694,257, filed on Nov. 25, 2019, now Pat. No. 11,403,075.

(51) Int. Cl.
*G06F 9/44* (2018.01)
*G06F 8/33* (2018.01)
(Continued)

(52) U.S. Cl.
CPC .............. *G06F 8/33* (2013.01); *G06F 8/315* (2013.01); *G06F 8/41* (2013.01); *G06F 9/44589* (2013.01)

(58) Field of Classification Search
None
See application file for complete search history.

(56) References Cited

U.S. PATENT DOCUMENTS 6,601,114 B1 7/2003 Bracha et al.
6,618,769 B1 9/2003 Bracha et al.
(Continued)

FOREIGN PATENT DOCUMENTS

JP 2000039997 2/2000

OTHER PUBLICATIONS

Leroy, "Java Bytecode Verification: Algorithms and Formalizations", https://link.springer.com/article/10.1023/A:1025055424017, Springer Link, May 2003, vol. 30, Issue 3-4, 35 pages.
(Continued)

*Primary Examiner* — Insun Kang
(74) *Attorney, Agent, or Firm* — Michael O'Keefe; Andrew D. Wright; Calderon Safran & Cole P.C.

(57) ABSTRACT

A computer-implemented method for bytecode class verification includes: encountering a class requiring verification of its bytecode during a run of an application; determining whether class relationship data for the class exists in a shared classes cache; in response to a determination that the class relationship data for the class does not exist in the shared classes cache: performing a linear bytecode walk of the bytecode to identify relationship data for the class and verify that the bytecode is well-formed; and storing the identified relationship data as the class relationship data for the class in the shared classes cache; in response to a determination that the class relationship data for the class does exist in the shared classes cache: retrieving the class relationship data for the class from the shared classes cache; and processing the class relationship data.

20 Claims, 6 Drawing Sheets

(51) Int. Cl.
    *G06F 9/445*     (2018.01)
    *G06F 8/41*     (2018.01)
    *G06F 8/30*     (2018.01)

(56) References Cited

U.S. PATENT DOCUMENTS

| | | | |
|---|---|---|---|
| 6,618,855 B1 | 9/2003 | Lindholm et al. | |
| 7,316,010 B1 | 1/2008 | Daynes et al. | |
| 7,526,760 B1 | 4/2009 | Daynes et al. | |
| 8,060,812 B2* | 11/2011 | Branda | G06F 11/1004 |
| | | | 714/10 |
| 8,082,542 B2 | 12/2011 | Bottomley et al. | |
| 8,225,311 B1* | 7/2012 | Robertson | G06F 9/44521 |
| | | | 717/172 |
| 8,533,687 B1 | 9/2013 | Greifeneder et al. | |
| 8,769,518 B1 | 7/2014 | Daudel et al. | |
| 9,213,826 B2 | 12/2015 | Gu et al. | |
| 9,250,938 B2 | 2/2016 | Herring et al. | |
| 9,336,018 B2* | 5/2016 | Zhou | G06F 9/445 |
| 9,928,058 B1* | 3/2018 | Beranek | G06F 9/45504 |
| 10,255,062 B1 | 4/2019 | Beranek et al. | |
| 11,150,915 B2 | 10/2021 | Heidinga et al. | |
| 2005/0091650 A1 | 4/2005 | Heeb | |
| 2006/0070051 A1 | 3/2006 | Kuck et al. | |
| 2006/0161896 A1 | 7/2006 | Hicks et al. | |
| 2007/0169072 A1 | 7/2007 | Corrie | |
| 2008/0271002 A1 | 10/2008 | Susarla et al. | |
| 2009/0031202 A1 | 1/2009 | Branda et al. | |
| 2009/0217022 A1 | 8/2009 | Chi et al. | |
| 2010/0095284 A1 | 4/2010 | Herring et al. | |
| 2010/0199259 A1 | 8/2010 | Quinn et al. | |
| 2010/0306742 A1 | 12/2010 | Schneider | |
| 2012/0169729 A1 | 7/2012 | Yamaji et al. | |
| 2013/0145348 A1 | 6/2013 | Agovic et al. | |
| 2013/0212567 A1 | 8/2013 | Fisher et al. | |
| 2014/0351802 A1 | 11/2014 | Eliais et al. | |
| 2015/0317167 A1 | 11/2015 | Zhou et al. | |
| 2016/0062878 A1 | 3/2016 | Westrelin et al. | |
| 2017/0249252 A1 | 8/2017 | Elias et al. | |
| 2017/0286065 A1* | 10/2017 | Zhou | G06F 9/449 |
| 2018/0129684 A1 | 5/2018 | Wilson et al. | |
| 2018/0373545 A1 | 12/2018 | Daudel et al. | |
| 2019/0215394 A1 | 7/2019 | Torvinen et al. | |
| 2020/0004508 A1 | 1/2020 | Zhou et al. | |
| 2020/0241892 A1* | 7/2020 | Tu | G06F 9/44594 |
| 2021/0157552 A1 | 5/2021 | Wang et al. | |

OTHER PUBLICATIONS

Coglio, "Checking Access to Protected Members in the Java Virtual Machine", http://www.jot.fm/issues/issue_2005_10/article3.pdf, Journal of Object Technology, 2005, vol. 4 No. 8, 22 pages.

Evans, "Real-World Bytecode Handling with ASM", https://blogs.oracle.com/javamagazine/real-world-bytecode-handling-with-asm, Java magazine, Aug. 1, 2018, 11 pages.

Kuhn, "Bytecode Verification and Security", http://www.ebb.org/bkuhn/articles/thesis/node8.html, 2000-2001, 1 page.

Horstmann, "Core Java Security: Class Loaders, Security Managers, and Encryption", http://www.informit.com/articles/article.aspx?p=1187967, Pearson, Apr. 16, 2008, 10 pages.

Horstmann, "Core Java Security: Class Loaders, Security Managers, and Encryption; Bytecode Verification", http://http://www.informit.com/articles/article.aspx?p=1187967&seqNum=2, Pearson, Apr. 16, 2008, 5 pages.

List of IBM Patents or Patent Applications Treated as Related, dated May 27, 2022, 1 page.

* cited by examiner

US 11,662,983 B2

BYTECODE VERIFICATION USING CLASS RELATIONSHIP CACHING

BACKGROUND

Aspects of the present invention relate generally to optimizing runtime in computing devices and, more particularly, to bytecode verification using class relationship caching.

A programming language used by programmers to code instructions is commonly known as a high level language. High level instructions are computer instructions coded in a high level language. Source code is high level code comprising high level instructions. A compiler compiles source code into bytecode.

Bytecode is a set of low level instructions. A low level instruction is an instruction that is consumable for performing an operation, or otherwise understood and usable by an interpreter. Compilers and interpreters are software tools used in the process of preparing a source code for execution on data processing hardware under the control of an operating system.

In some cases, as in the case of Java or C#, bytecode can be executed or interpreted by a virtual machine such as Java Virtual Machine (JVM). (Java, Java Virtual Machine, and JVM are trademarks owned by Oracle Corporation. C# is a mark owned by Microsoft Corporation). In other cases, bytecode is further transformed into machine code. A processor understands and executes machine code.

A runtime environment is a data processing environment in which bytecode or machine code interacts with hardware components such as processor and memory to perform desired operations encoded in the source code. A managed runtime environment (MRE) (also interchangeably referred to herein as "managed runtime") is a virtualized data processing system, virtualized data processing environment, or virtual machine, e.g., JVM, which executes, operates, or interprets bytecode.

SUMMARY

In a first aspect of the invention, there is a computer-implemented method for bytecode class verification, the computer-implemented method including: encountering a class requiring verification of its bytecode during a run of an application; determining whether class relationship data for the class exists in a shared classes cache; in response to a determination that the class relationship data for the class does not exist in the shared classes cache: performing a linear bytecode walk of the bytecode to identify relationship data for the class and verify that the bytecode is well-formed; and storing the identified relationship data as the class relationship data for the class in the shared classes cache; in response to a determination that the class relationship data for the class does exist in the shared classes cache: retrieving the class relationship data for the class from the shared classes cache; and processing the class relationship data.

In another aspect of the invention, there is a computer program product comprising one or more computer readable storage media, and program instructions collectively stored on the one or more computer readable storage media, the program instructions executable to: determine, in a managed runtime environment (MRE), a current run of an application is not a first run of the application, the determining being performed upon encountering a class of the application requiring verification of its bytecode; based on the determining, obtain class relationship data from a shared classes cache, the class relationship data defining a relationship between a first class and a second class; determine the second class is not loaded for verification; record the relationship between the first class and the second class in a class relationship table of a class loader; cause the MRE to omit loading the second class; and continue execution of the application encoded in the bytecode.

In another aspect of the invention, there is a system including a processor, a computer readable memory, one or more computer readable storage media, and program instructions collectively stored on the one or more computer readable storage media, the program instructions executable by the processor to: determine, in a managed runtime environment (MRE), whether a current run of an application is a first run of the application, the determining being performed upon encountering a class of the application requiring verification of its bytecode; in response to a determination that the current run is the first run of the application: performing a linear bytecode walk of the bytecode to validate its well-formedness and identify relationship data for the class; and storing the identified relationship data as the class relationship data for the class in the shared classes cache; in response to a determination that the current run is not the first run of the application: retrieving the class relationship data for the class from the shared classes cache; processing the class relationship data; and continue execution of the application encoded in the bytecode.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
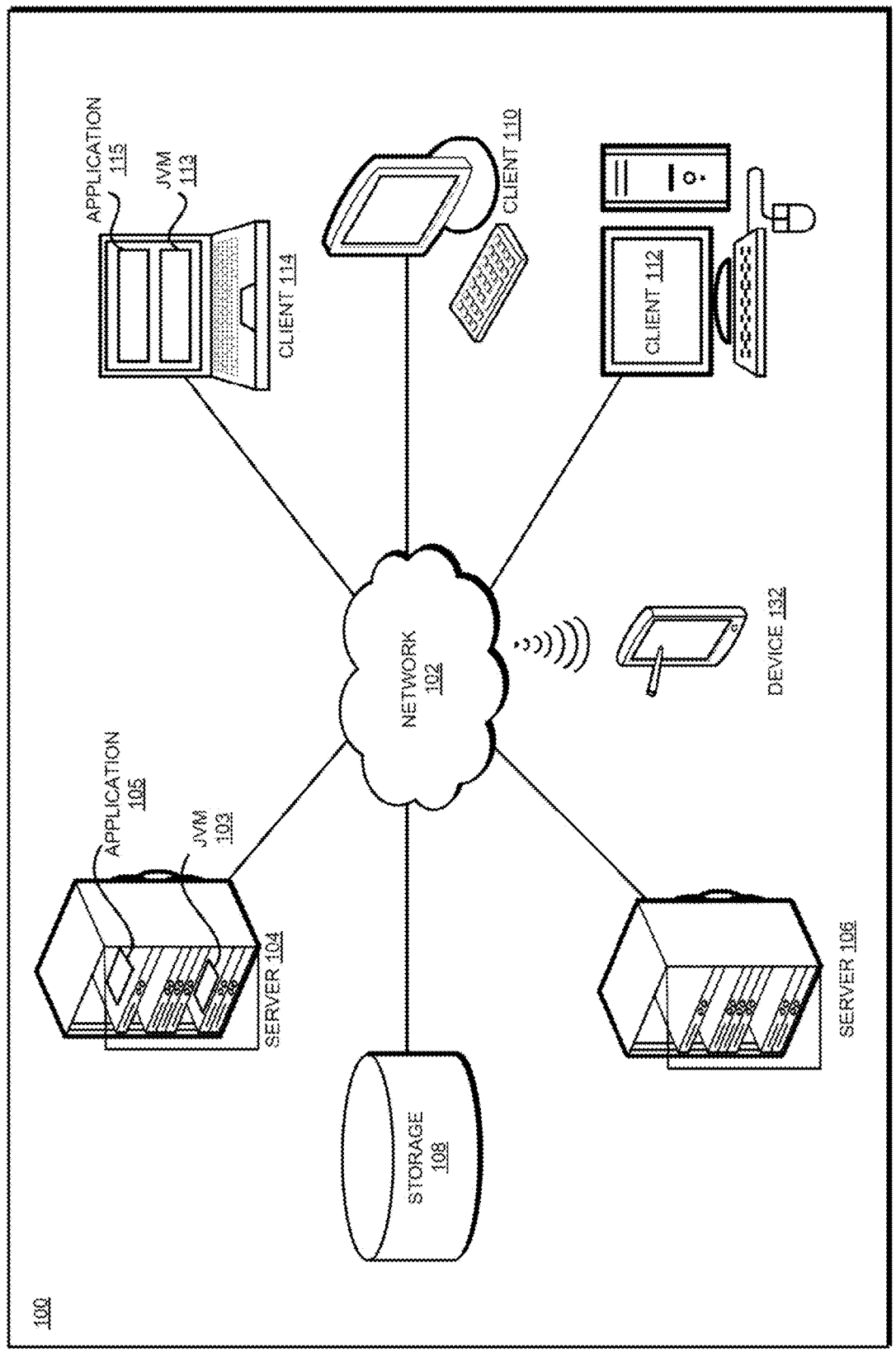
FIG. 1 depicts a block diagram of a network of data processing systems in which illustrative embodiments may be implemented.

Aspects of the present invention relate generally to optimizing runtime in computing devices and, more particularly, to bytecode verification using class relationship caching. Implementations of the invention provide for generating and caching metadata about code to avoid repeated bytecode verification and enable lazy class loading. Embodiments of the invention include a bytecode verification process that caches metadata about the code, in particular class relationship data stored as snippets in a shared classes cache, in order to optimize subsequent runs by avoiding duplicative bytecode verification tasks and by delaying class loading.

Existing bytecode verifiers require a linear bytecode walk in each run of an application in order to validate the bytecodes well-formedness and capture class relationship data. Implementations of the invention instead require only one linear bytecode walk, which takes place during the first run of an application. Subsequent runs take advantage of cached data stored during the first run, so that the linear bytecode walk need not be repeated to gather the same information already captured in the first run. According to aspects of the invention, the first run involves walking bytecodes for each class and saving each class relationship in a shared classes cache. When a class is used in subsequent runs, the combination of the class being from the shared classes cache and having cached class relationships indicates that the verification has already succeeded in a previous run and doesn't need to be repeated.

Aspects of the present invention provide an extension to deferred bytecode class verification by caching the class relationship data recorded from the initial bytecode walk, so that the data does not need to be regenerated from the bytecode in future runs or by other virtual machines (VMs) running the same application. In embodiments, for each subsequent run, walking the bytecodes to validate its well-formedness and store each class relationship is no longer needed—instead, the VM retrieves the already stored class relationship data (from the shared classes cache). Since only one linear bytecode walk is conducted, subsequent runs benefit from avoiding this linear bytecode walk each time the application is run, thus reducing VM startup costs.

In accordance with aspects of the present invention, all class relationships are recorded and cached as relationship snippets. This is in contrast with verification processes in which relationships for classes that had already been loaded were not recorded. In embodiments, all relationships defined in the bytecodes of a particular class are recorded during an initial run in which the particular class is required to be verified. This addresses the uncertainty of not knowing which classes will be loaded in subsequent runs. For example, application behavior can vary between runs, such that it is advantageous to identify and store all class relationships during a first run, instead of only storing a subset of relationships as is done in verification processes in which relationships for classes that have already been loaded are not recorded. Thus, in implementations of the invention, even if a source class and its target class are already loaded, the system stores their relationships in the shared classes cache for use in subsequent runs.

According to aspects of the invention, there is a computer-implemented process for bytecode class verification, the computer-implemented process comprising: determining, for a given class, whether class relationship data comprising snippets exist in a shared classes cache for the given class, wherein a snippet represents a relationship between two classes including a source class designated an inferred type and a target class designated an expected type; in response to a determination the class relationship data comprising snippets for the given class does not exist, performing a linear bytecode walk to verify that the bytecode is well-formed and to identify data for the given class; storing the data identified as the class relationship data comprising snippets in the shared classes cache; in response to a determination class relationship data comprising snippets for the given class exists, retrieving the class relationship data comprising snippets for the given class from the shared classes cache; processing the snippets to validate class relationships when only both a source and a target class are loaded; and in response to a determination indicating one of the source class is not loaded, the target class is not loaded, and none of the classes are loaded, registering the class relationships in a class relationship table in the class loader. The verification of these registered classes is thus deferred to the point at which these classes are loaded and verification of these classes is requested.

In accordance with further aspects, a method includes: determining, in a managed runtime environment (MRE), a current run of an application is not a first run of the application, the determining being performed upon encountering a class requiring verification; based on the determining, either processing the class relationship data obtained from a shared classes cache (i.e. not a first run), or processing the class relationship data generated from the class's bytecodes (i.e. first run); the class relationship data defining a collection of relationships between a first class and a second class; processing the class relationship data entailing: for each relationship defined in the collection, determine that either one of the classes or both classes are not already loaded; record the relationship between the first class and the second class in a class relationship table of a class loader; cause the MRE to omit loading the yet-to-be-loaded classes; and upon completion of processing class relationship data, continuing the execution of the application encoded in the bytecode.

Java as a source code language and an MRE including JVM are used herein as examples to describe and illustrate the various embodiments with clarity. These examples of the particular language or MRE are not intended to be limiting. From this disclosure, those of ordinary skill in the art will be able to conceive many other languages and MREs to which an embodiment is either applicable or adaptable, and the same are contemplated within the scope of the illustrative embodiments.

Managed runtime environment and bytecode generation and use are well recognized technological fields of endeavor. The present state of the technology in these fields of endeavor has certain drawbacks and limitations. The operations and/or configurations of the illustrative embodiments impart additional or new capabilities to improve the existing technology in the technological field of endeavor of managed runtime environment and bytecode generation and use, especially in the area of verification of bytecode prior to execution in order to avoid unsafe bytecode, bytecode from operating on the incorrect types, malformed bytecode, or improperly configured bytecode from executing and causing system disruption.

The illustrative embodiments recognize that Java, and many other managed runtimes, require compiled bytecode to be verified before being loaded to ensure that invariants in the specification are not violated. This verification process ensures that all the code being run is well formed and safe to be run in that it will not cause the virtual machine to crash, corrupt memory, or operate incorrectly.

In JVM, verification validates that the execution stack is well formed. The verification confirms that the stack has the same shape at the start of any basic block (jump target), no overflows or underflows occur, the types of arguments and returns are compatible, assignments to variables and fields have the right type, and other functions directed towards similar purposes.

The presently available verifier in an MRE performs these types of compatibility checks by loading each class encountered in the bytecode when the names are not identical, and checking the relationships between the loaded classes at points where the verifier needs to merge stack shapes, such as at method calls. As a part of this process, the presently available verifier loads each source (i.e., a starting class), checking either (i) that a target (i.e. an ending class) is a superclass of the source, or (ii) that the target is an interface regardless of whether the source implements it as an interface.

An embodiment can be implemented as a combination of certain hardware components and a software application. An implementation of an embodiment, or one or more components thereof, can be configured as a modification of an existing MRE, with a companion software application executing in some combination of (i) the MRE itself, (ii) a data processing system communicating with the MRE over short-range radio or a local area network (LAN), and (iii) a data processing system communicating with the MRE over a wide area network (WAN).

The manner of bytecode verification using class relationship caching and deferred bytecode class verification in managed runtime environments described herein is unavailable in the presently available methods in the technological field of endeavor pertaining to bytecode verification in MREs. A method of an embodiment described herein, when implemented to execute on a device or data processing system, comprises substantial advancement of the functionality of that device or data processing system in speeding up application startup, reducing startup latency, compacting the memory occupied by loaded classes at startup, or some combination thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments are described with respect to certain types of languages, code, bytecode, runtime environments, MREs, timing, tables, records, relationships, classes, verifications, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
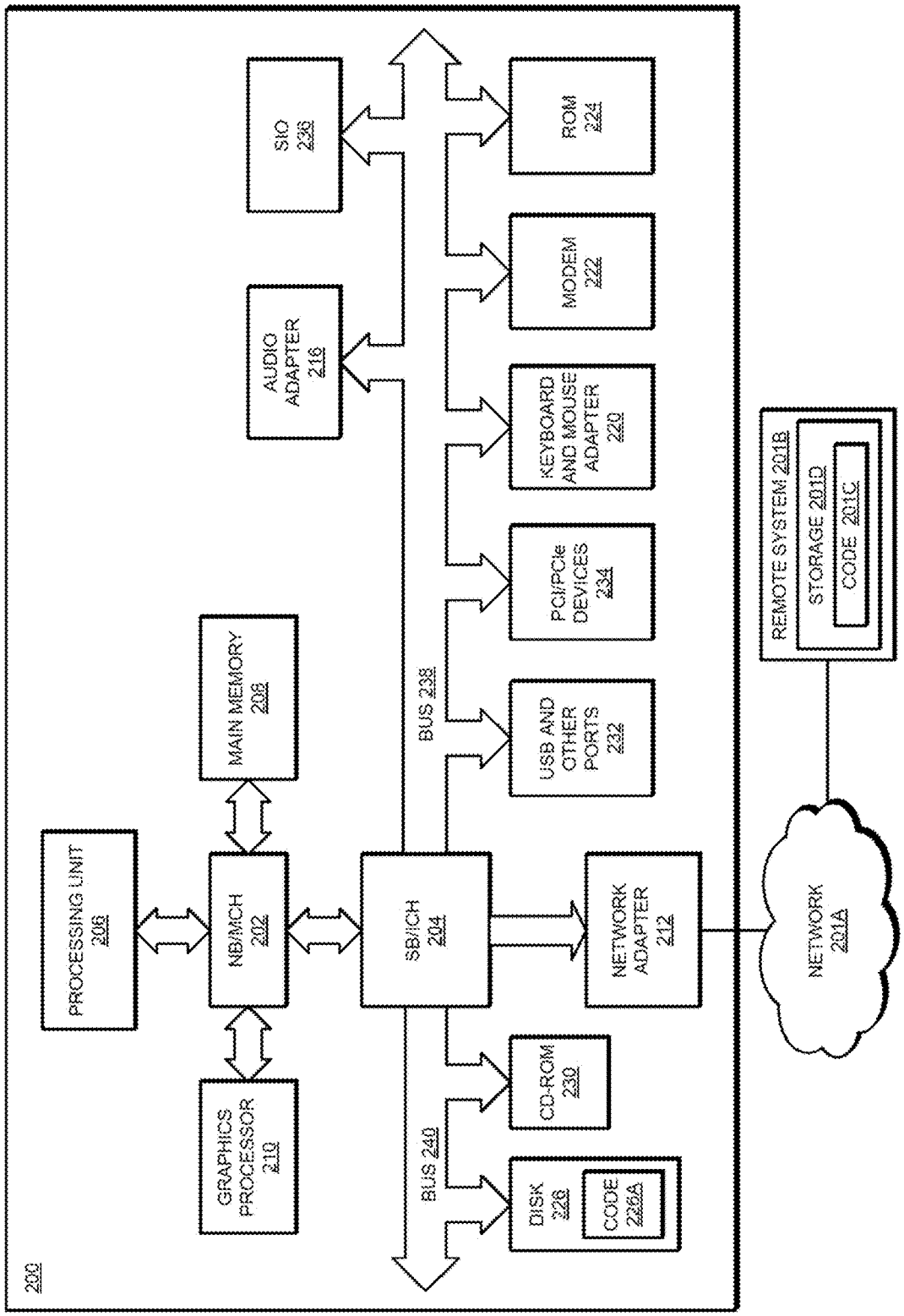
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment and operates in conjunction with an MRE, such as JVM 103. Application 105 and MRE 103 operate together as described herein when the embodiment is implemented on a server, such as on server 104. Application 115 implements an embodiment and operates in conjunction with an MRE, such as JVM 113. Application 115 and MRE 113 operate together as described herein when the embodiment is implemented on a client, such as on client 114. Components of application 105 and or 115 can be distributed across more than one system within the scope of illustrative embodiments.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object-oriented or other type of programming system may operate in conjunction with the operating system and provide calls to the operating system from programs or applications executing on data processing system 200.

Instructions for the operating system, the object-oriented programming system, and applications or programs, such as application 105 or application 115 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
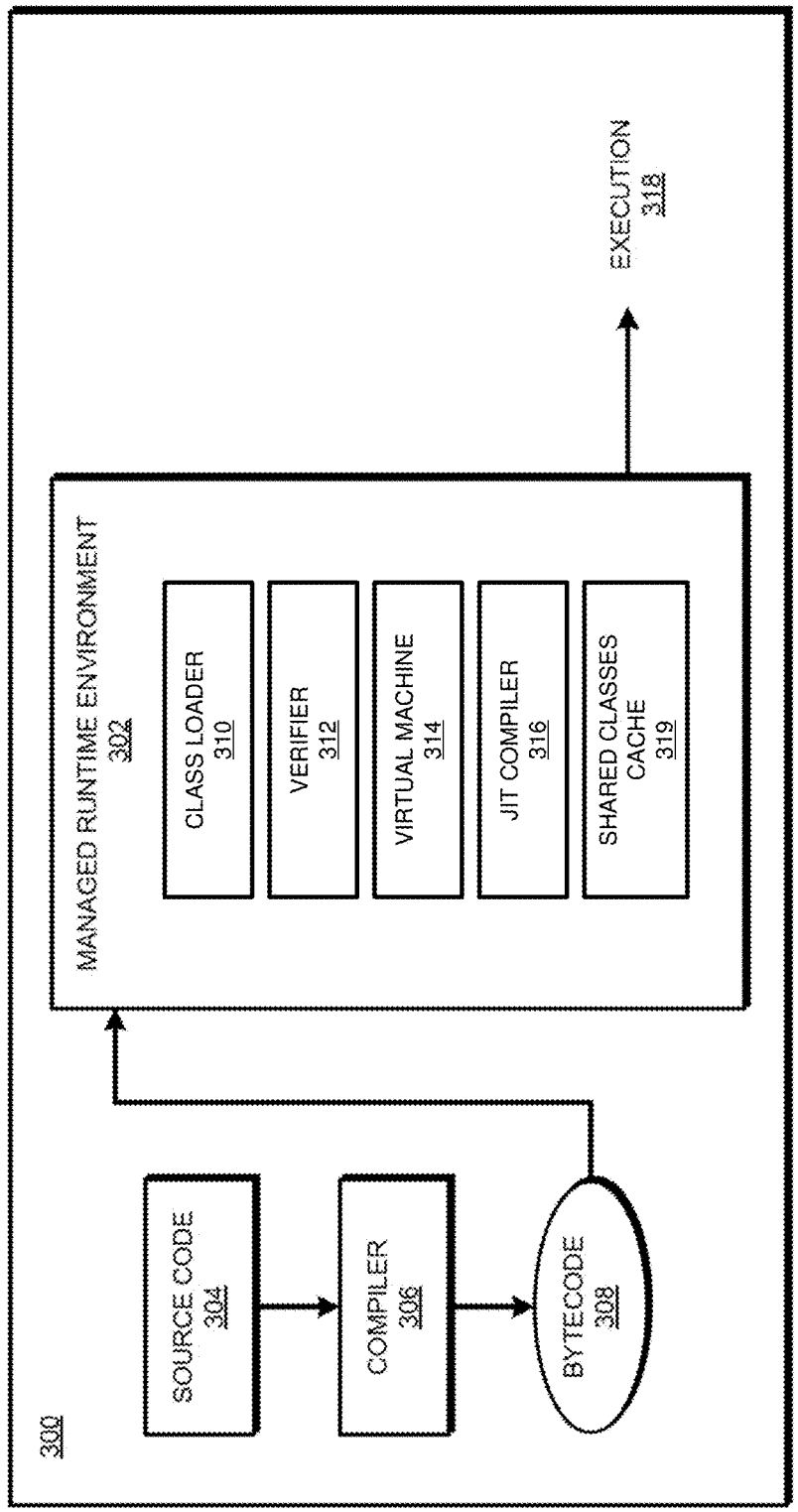
FIG. 3 depicts a block diagram of an example configuration in which an illustrative embodiment can be implemented.

With reference to FIG. 3, this figure depicts a block diagram of an example configuration in which an illustrative embodiment can be implemented. Configuration 300 depicts an example MRE 302. Source code 304 is source code of a class-based, object-oriented programming application, such as a Java application, and is a high level language input source code as described herein. Compiler 306 performs lightweight compilation on source code 304 in a non-platform specific manner to produce bytecode 308.

Class loader 310 loads a class based on a relationship identified in bytecode 308. Verifier 312 performs a presently available verification function as described herein, including a linear bytecode walk in each run of the application. Virtual machine (VM) 314 interprets or executes bytecode as appropriate according to the nature and language of source code. JVM is an example of VM 314. In case of Java code forming source code 304, JVM 314 performs execution 318 of the application encoded in source code 304.

In cases where further compilation is needed to produce machine code from bytecode 308, compiler 316 performs such compilation functions and produces machine code (not shown). The machine code is executed by a processor in execution 318. In embodiments, the MRE 302 includes a shared classes cache 319 as described herein.

Figure 4:
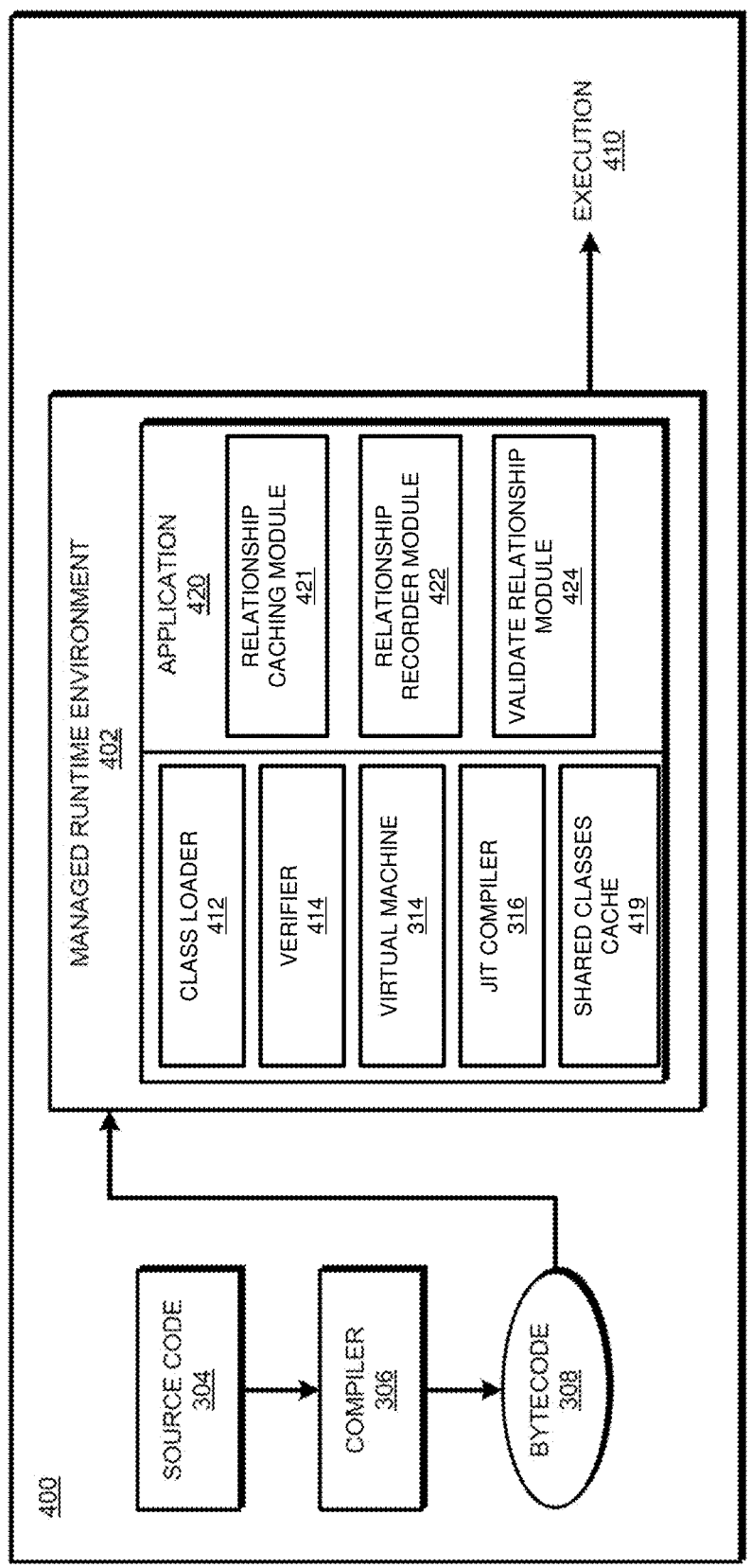
FIG. 4 depicts a block diagram of an improved configuration for deferred bytecode class verification in managed runtime environments in accordance with an illustrative embodiment.

With reference to FIG. 4, this figure depicts a block diagram of an improved configuration for bytecode class verification in managed runtime environments in accordance with an illustrative embodiment. Configuration 400 depicts MRE 402 in which application 420 operates in conjunction with the components described in FIG. 3. Application 420 is an example of application 105, application 115, or some combination thereof depending on the specific implementation. Common reference numbers between FIGS. 3 and 4 refer to the same artifacts as described with respect to FIG. 3.

Class loader 412 is a modified form of class loader 312 in that in some implementations, application 420 interfaces with class loader 412 such that the relationship verification process of the embodiment also checks the class loader constraints so as to prevent invalid classes from being loaded. In other implementations, class loader 312 can be used in place of class loader 412 when an embodiment that does not check for class loader constraints is implemented.

Verifier 414 is a modified form of verifier 312 in that application 420 interfaces with verifier 414 to perform an operation described herein. In embodiments, when verifier 312 encounters a class during a run of an application (e.g., an application encoded in source code 304 and compiled as bytecode 308), verifier 414 calls relationship caching module 421. Relationship caching module 421 determines whether this is a first run of the application or a subsequent run (i.e., not first run) of the application. According to aspects of the invention, relationship caching module 421 determines whether the current run is a first run or a subsequent run based on data stored in a shared classes cache 419. On one hand, relationship caching module 421 determines that the current run is a first run when there is not any data in the shared classes cache for this particular class. On the other hand, relationship caching module 421 determines that the current run is not a first run when there is data in the shared classes cache 419 for this particular class.

In accordance with aspects of the invention, when relationship caching module 421 determines that the current run is a first run, module 414 performs a first run verification including a linear bytecode walk of the bytecode 308. In embodiments, the linear bytecode walk of the bytecode 308 includes, amongst verifying that the bytecode is well-formed, identifying every relationship between a source class and a target class in the bytecode. Each relationship identified during this bytecode walk, regardless of whether or not the source class and/or target class are loaded, are stored as relationship snippets (e.g., in the form of metadata) by module 421 in the shared classes cache 419. After the linear bytecode walk of this first run is successfully completed, each relationship snippet is processed using relationship recorder module 422 or validate relationship module 424, as described herein.

In accordance with aspects of the invention, when relationship caching module 421 determines that the current run is a subsequent run (i.e., not a first run), relationship caching module 421 retrieves the relationship snippets from the shared classes cache without performing a linear bytecode walk of the bytecode. After retrieving the relationship snippets from the shared classes cache, each relationship snippet is processed using relationship recorder module 422 or validate relationship module 424, as described herein.

According to further aspects of the invention, the relationship snippets are processed using a deferred bytecode class verification process. For each of the relationship snippets, relationship recorder module 422 determines whether both classes, i.e., the source class and the target class defined in the relationship snippet, are already loaded. If both classes are already loaded, then relationship recorder module 422 does not record this relationship in the class relationship table of class loader 412, and relationship recorder module 422 passes this relationship to validate module 424, which validates the relationship immediately. If both classes are not loaded (e.g., one or both of the source class and the target class are not loaded), then relationship recorder module 422 records this relationship in the class relationship table of class loader 412, e.g., for deferred validation at a later time when both classes are loaded. In embodiments, relationship recorder module 422 records the relationship by adding an entry to a class relationship table of the class loader 412 for the source class and the target class of the relationship. Each of the entries recorded in the class relationship table are unique within the scope of the bytecode. Relationship recorder module 422 then determines whether another unprocessed relationship snippet exists for this class. If another unprocessed relationship snippet exists, then the processing steps are repeated for the next unprocessed relationship snippet. If another unprocessed relationship snippet does not exist, then relationship recorder module 422 passes the control back to verifier 414 such that verifier 414 progresses the verification process.

During runtime, when an as-yet-not-loaded class is called, needed, or required to be available, validate relationship module 424 looks up the relationship record created by relationship recorder module 422, causes verifier 414 to load the as-yet-not-loaded class to be loaded and verified, and causes VM 314 to continue the execution with the newly loaded class. For maintaining the continuity of execution, in one embodiment, validate relationship module 424 looks up the relationship record created by relationship recorder module 422 and causes verifier 414 to load the as-yet-not-loaded class to be loaded and verified some time before the as-yet-not-loaded class is called, needed, or required to be available.

Figure 6:
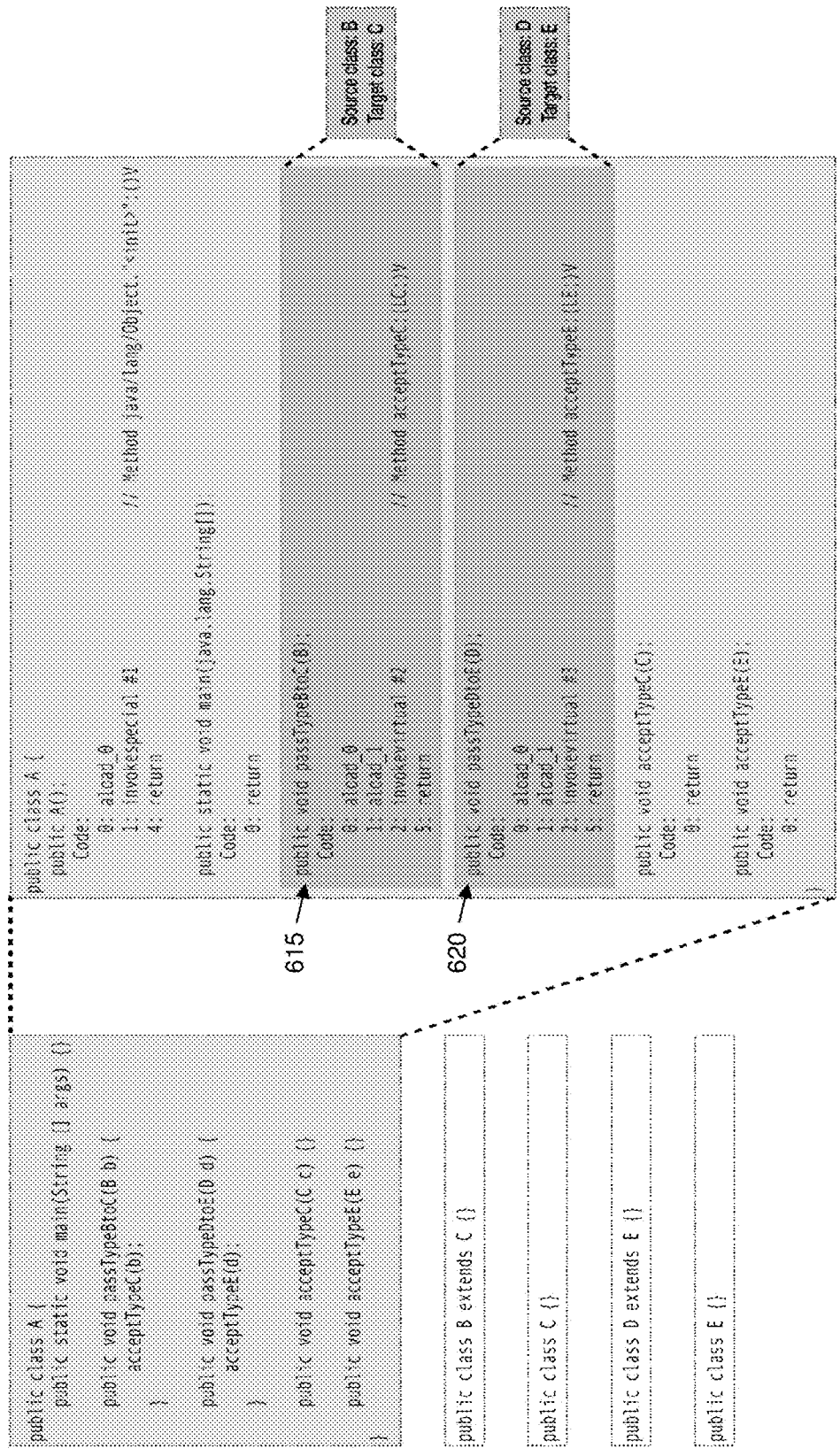
FIG. 6 shows an exemplary use case in accordance with aspects of the invention.

In accordance with aspects of the invention, each snippet represents a relationship between two classes: a source class (e.g., an inferred type) and a target class (e.g., an expected type). In embodiments, a relationship snippet is metadata stored in a cache, the metadata defining a relationship between two classes based on bytecode of an encountered class. For example, as shown in FIG. 6, the bytecode for class A includes a first relationship between class B and class C, and another relationship between class D and class E. In embodiments, the relationship snippet defines the classes (e.g., B and C) and the relationship between the classes (e.g., B is the source and class C is the target). As the system encounters class relationships during the first run linear bytecode walk for a class, the system generates relationship snippets to record these relationships between classes. When the first run linear bytecode walk for a class is complete, the shared classes cache contains a set of relationship snippets for that class. In embodiments, these relationship snippets are stored in the shared classes cache in a manner that associates all of the relationship snippets to the class to which they belong. During the first run, the system proceeds to processing the relationships recorded in these generated snippets. In subsequent runs, the system loads the snippets that were previously stored in the shared classes cache during the first run, and then proceeds to process the relationships. In embodiments, when processing the relationships, for each relationship snippet for the current class, the system either validates the relationship between the classes defined in the relationship snippet or registers the relationship. If both classes in the relationship snippet are loaded, then the system validates the relationship between the classes. If both classes in the relationship snippet are not loaded (i.e. either one or both of the classes are not loaded), then the system registers the relationship in a class relationship table in the class loader.

Figure 5:
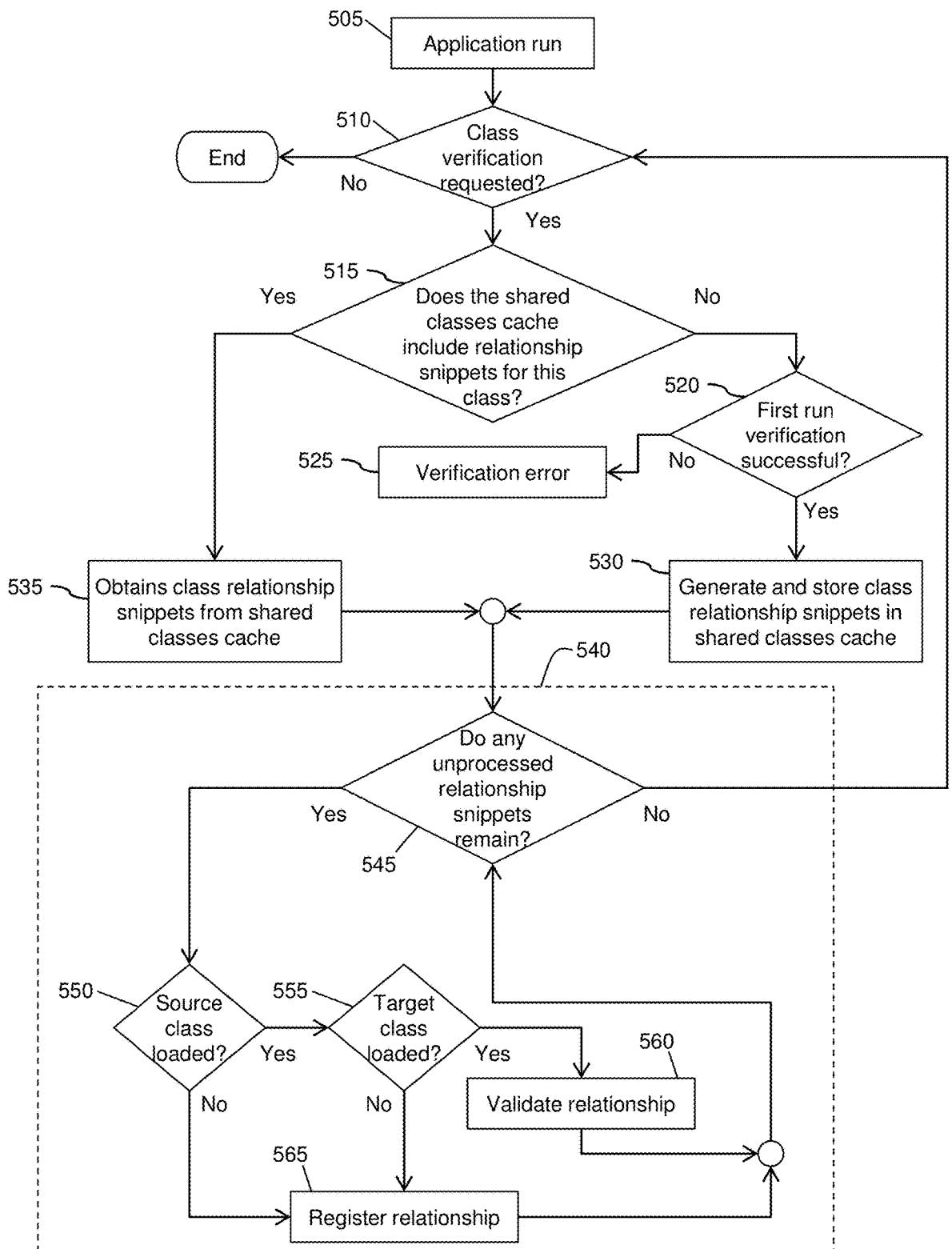
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 2 and triggered by the application 420 depicted in FIG. 4.

At step 505, the system encounters a run of an application, e.g., a class-based, object-oriented programming application, such as a Java application, encoded in source code 304. Step 505 may include compiling the source code 304 of the application into bytecode 308.

At step 510, when a class is required to be verified in the application, the system determines whether this is a first run of the application or a subsequent (e.g., not first) run of the application. In embodiments, and as described with respect to FIG. 4, the module 421 determines whether this is a first run by determining whether there is data stored in the shared classes cache for this class that was encountered at step 510.

In the event that this is a first run of the application (i.e., is data stored in the shared classes cache for this class?=No), then at step 520 the system performs a verification for this class and determines whether the verification was successful. In embodiments, the verification includes verifying that the bytecodes are well-formed, which may include steps such as: initializing variables before they are used; ensuring that calls match the types of object references; ensuring rules for accessing private data and methods are not violated; ensuring local variable accesses fall within the runtime stack; and ensuring that the runtime stack does not overflow or underflow. In embodiments, and as described with respect to FIG. 4, the verification includes performing a linear bytecode walk of the bytecode, the linear bytecode walk being used to identify every relationship between a source class and a target class in the bytecode, regardless of whether or not the source class and/or target class are loaded.

In the event the verification at step 520 is not successful, then at step 525 the system produces a verification error and the process ends. In the event the verification at step 520 is successful, then at step 530 the system generates and stores data defining the relationships identified in the linear bytecode walk. In embodiments, and as described with respect to FIG. 4, step 530 comprises module 421 generating and storing relationship snippets in a shared classes cache.

In the event that this is not a first run of the application (i.e., is data stored in the shared classes cache for this class?=Yes), then at step 535 the system obtains the class relationship snippets for this class from the shared classes cache. Following either of steps 530 and 535, at the system processes the relationship snippets for this class, e.g., as indicated at the dashed box 540.

At step 545, the system determines whether any unprocessed relationship snippets remain for this class. When at least one unprocessed relationship snippet remains, then at step 550 the system determines whether, for the next unprocessed relationship snippet, the source class is currently loaded. If the source class for this relationship snippet is loaded, then at step 555 the system determines whether the target class is also loaded for this relationship snippet. If both the source class and the target class of this relationship snippet are loaded, then at step 560 the system validates the relationship between the source class and the target class. Conventional source/target class validation techniques may be employed at step 560. However, if either or both of the source class and the target class are not loaded, then at step 565 the system registers the relationship between the source class and the target class for this relationship snippet. In embodiments, as described with respect to FIG. 4, step 565 comprises relationship recorder module 422 recording the relationship in the class relationship table of class loader 412, e.g., by identifying the source class and the target class of the relationship in a class relationship table, for deferred validation at a later time when both classes are loaded. After validating or registering, the process returns to step 545 to determine if there are any remaining unprocessed relationship snippets. If there are none remaining, the process returns to step 510 to wait for another request for a class to be verified.

FIG. 6 shows an example use case in accordance with aspects of the invention. The processes described with respect to FIG. 6 may be performed using steps of the method of claim 5, and in the environment shown in FIG. 4.

In the example shown in FIG. 6, the system is performing the linear bytecode walk of the bytecode of class A. Classes in the application are shown at 605, and the bytecode of class A is shown at 610. In this example, classes B and C are already loaded, and classes D and E are not yet loaded, when the system is performing the linear bytecode walk of class A.

In accordance with aspects of the present invention, each relationship encountered in the bytecode is recorded during the linear bytecode walk, regardless of whether or not the source class and/or target class are already loaded. In this example, the system identifies a relationship between class B and class C based on bytecode section 615 (i.e., B and C are related as source and target, respectively). In this example, the system also identifies a relationship between class D and class E based on bytecode section 620 (i.e., D and E are related as source and target, respectively). In this example, according to embodiments, both of these relationships (i.e., B and C, and D and E) are saved as relationship snippets in the shared classes cache (e.g., at step 530). After the linear bytecode walk is complete, the system proceeds to process these relationship snippets (e.g., at step 540). As described herein, for each relationship snippet for the class at hand, if both classes of the relationship snippet are loaded, then the system validates the relationship between the two classes immediately and does not record the relationship in the class loader's relationship table (e.g., as at step 560). Alternatively, as described herein, if either of the classes defined in the relationship snippet is not loaded, then the system records the relationship in the class loader's relationship table (e.g., as at step 565). As such, for the example of FIG. 6, since B and C are already loaded, the system validates the relationship between these classes and does not record the relationship in the class loader's class relationship table. And since D and E are both not loaded, the system records their relationship in the class loader's class relationship table, but does not validate until a later time when both classes are loaded.

In embodiments, the processing at step 540 includes a method comprising: preventing, during verification of a bytecode, responsive to a second class remaining to be loaded for verification in an MRE, a verifier in the MRE from loading the second class, wherein the bytecode includes a relationship between a first class and the second class; recording the relationship; causing the verifier to omit a loading operation on the second class; triggering an execution of an application encoded in the bytecode; and causing the second class to be loaded and verified prior to a use of the second class during the execution. In exemplary embodiments the method comprises: detecting, during the execution that the execution has reached an execution point where the second class has to be available, wherein causing the second class to be loaded is responsive to the execution reaching the execution point. In exemplary embodiments the execution point is prior to a second execution point where the second class is called in the execution.

With continued reference to the processing at step 540, in exemplary embodiments the method comprises: preventing, during verification of the bytecode, responsive to a fourth class remaining to be loaded for verification in the MRE, the verifier in the MRE from loading the fourth class, wherein the bytecode includes a second relationship between a third class and the fourth class; recording the second relationship; causing the verifier to omit a second loading operation on the fourth class; and avoiding, for an entirety of the execution, loading the fourth class regardless of the second relationship existing in the bytecode between the third class and the fourth class. In exemplary embodiments the first class is a source class, and wherein the second class is a target class. In exemplary embodiments the method comprises: determining that the first class is also remaining to be loaded during the verification of the bytecode, wherein the preventing is further responsive to determining that the first class also remaining to be loaded during the verification of the bytecode.

Still referring to the processing at step 540, in exemplary embodiments the method comprises: identifying, using the verifier in the MRE, the relationship between the first class and the second class in the bytecode. In exemplary embodiments the method comprises: intercepting the verification of the bytecode at a point where the verifier is verifying the relationship, the preventing being responsive to the intercepting. In exemplary embodiments the method comprises: adding, as a part of the recording, a class relationship table, a new record comprising a first identifier of the first class and a second identifier of the second class. In exemplary embodiments the second identifier of the second class is unique within the bytecode. In exemplary embodiments the method comprises: causing the verifier to further omit a verification operation on the second class. In exemplary embodiments the method comprises: allowing, responsive to causing the verifier to omit, the verifier to process a next relationship in the bytecode.

As described herein, embodiments of the invention use the class relationship snippets to differentiate between the first and subsequent runs to avoid redoing the linear bytecode walk each time the application runs. Implementations are not limited to using class relationship snippets. An alternative embodiment would be to use a tool such as the "jlink" tool that takes as input a set of Java modules (e.g., similar to a set of classes) and composes a single "modules" file that provides faster access to the classes. As part of the jlink process, the classes can be modified or examined. Aspects of the present invention could be implemented using the jlink tool by, at jlink time, doing the linear walk during this process and saving the class relationship snippets into the jlinked modules file. In such an implementation, the VM would be configured to determine if any standard methods for modifying classes at runtime (jvmti) had been used (or not), and then the class relationship snippets from the jlink modules file would be used in the same way the snippets from the shared classes cache described herein. As should be understood, other implementations that differentiate between first and later runs and associate metadata generated in first runs with later runs could be used to implement aspects of the invention.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   in response to a determination that class relationship data for a class does not exist in a shared classes cache during bytecode class verification, identifying and storing relationship data as the class relationship data for the class in the shared classes cache;
   in response to a determination that the class relationship data for the class does exist in the shared classes cache: retrieving the class relationship data for the class from the shared classes cache; and processing the class relationship data,
   wherein the class relationship data comprises at least one relationship snippet that defines a relationship between a source class and a target class, and
   the processing comprises determining whether the source class and the target class are both loaded.

2. The method of claim 1, wherein the identifying comprises performing a linear bytecode walk during a first run of an application.

3. The method of claim 2, further comprising preventing another linear bytecode walk during a subsequent run of the application.

4. The method of claim 2, wherein the application comprises an object-oriented programming application.

5. The method of claim 2, further comprising compiling source code of the application into bytecode used in the linear bytecode walk.

6. The method of claim 1, wherein the processing comprises:
   validating a class relationship between the source class and the target class in response to determining that the source class and the target class are both loaded; and
   registering a class relationship between the source class and the target class in response to determining that the source class and the target class are not both loaded.

7. The method of claim 6, wherein the registering comprises recording the class relationship in a class relationship table of a class loader without loading the one or more of the source class and the target class that are not loaded.

8. A computer program product comprising one or more computer readable storage media, and program instructions collectively stored on the one or more computer readable storage media, the program instructions executable to:
   in response to a determination that class relationship data for a class does not exist in a shared classes cache during bytecode class verification, identify and store relationship data as the class relationship data for the class in the shared classes cache;
   in response to a determination that the class relationship data for the class does exist in the shared classes cache: retrieve the class relationship data for the class from the shared classes cache; and process the class relationship data,
   wherein the class relationship data comprises at least one relationship snippet that defines a relationship between a source class and a target class, and
   the processing comprises determining whether the source class and the target class are both loaded.

9. The computer program product of claim 8, wherein the identifying comprises performing a linear bytecode walk during a first run of an application.

10. The computer program product of claim 9, further comprising preventing another linear bytecode walk during a subsequent run of the application.

11. The computer program product of claim 9, wherein the application comprises an object-oriented programming application.

12. The computer program product of claim 9, the program instructions are executable to compile source code of the application into bytecode used in the linear bytecode walk.

13. The computer program product of claim 8, wherein the processing comprises:
   validating a class relationship between the source class and the target class in response to determining that the source class and the target class are both loaded; and
   registering a class relationship between the source class and the target class in response to determining that the source class and the target class are not both loaded.

14. The computer program product of claim 13, wherein the registering comprises recording the class relationship in a class relationship table of a class loader without loading the one or more of the source class and the target class that are not loaded.

15. A system comprising:
   a processor, a computer readable memory, one or more computer readable storage media, and program instructions collectively stored on the one or more computer readable storage media, the program instructions executable by the processor to:

in response to a determination that class relationship data for a class does not exist in a shared classes cache during bytecode class verification, identify and store relationship data as the class relationship data for the class in the shared classes cache;

in response to a determination that the class relationship data for the class does exist in the shared classes cache: retrieve the class relationship data for the class from the shared classes cache; and process the class relationship data, wherein the class relationship data comprises at least one relationship snippet that defines a relationship between a source class and a target class, and the processing comprises determining whether the source class and the target class are both loaded.

16. The system of claim 15, wherein the identifying comprises performing a linear bytecode walk during a first run of an application.

17. The system of claim 16, further comprising preventing another linear bytecode walk during a subsequent run of the application.

18. The system of claim 16, wherein the application comprises an object-oriented programming application.

19. The system of claim 16, the program instructions are executable to compile source code of the application into bytecode used in the linear bytecode walk.

20. The system of claim 15, wherein the processing comprises:

validating a class relationship between the source class and the target class in response to determining that the source class and the target class are both loaded; and registering a class relationship between the source class and the target class in response to determining that the source class and the target class are not both loaded.

* * * * *